United States Patent [19]

Rice

[11] 4,016,764

[45] Apr. 12, 1977

[54] TEMPERATURE COMPENSATED, HIGH RESOLUTION PRESSURE TRANSDUCER BASED ON CAPACITANCE CHANGE PRINCIPLES

[75] Inventor: John H. Rice, Cumberland, Md.

[73] Assignee: The United States of America as represented by the Secretary of the Navy, Washington, D.C.

[22] Filed: July 19, 1976

[21] Appl. No.: 706,657

[52] U.S. Cl. .............................. 73/398 C; 73/88 E; 73/406; 361/283
[51] Int. Cl.² .......................................... G01L 9/12
[58] Field of Search ......... 73/398 C, 35, 167, 88 E, 73/406; 317/246

[56] References Cited

UNITED STATES PATENTS

| 2,576,488 | 11/1951 | Stovall, Jr. et al. | 317/246 |
| 3,280,628 | 10/1966 | Schloss | 317/246 |
| 3,529,468 | 9/1970 | Carlson | 73/88 E |

Primary Examiner—Donald O. Woodiel
Attorney, Agent, or Firm—Richard S. Sciascia; Paul N. Critchlow

[57] ABSTRACT

The transducer includes a sealed pressure reference cavity closed at one end by a thick, stiff base plate and at the other by a perimeter-clamped, taut diaphragm. A variable capacitor stack is constructed on the base plate within the reference cavity and the diaphragm is exposed to pressure variations in an environment to which it is exposed. Changes in pressure produce diaphragm deflection measured by the variable capacity. A load piston centrally carried by the diaphragm in flush contact with an upper capacitor plate distributively transmits environmental pressures to the capacitor plates. The use of the load piston achieves a unusually high and stable output that varies linearly with the pressure variations. Also the load piston permits a temperature compensation needed for accuracy.

12 Claims, 4 Drawing Figures

TEMPERATURE COMPENSATED, HIGH RESOLUTION PRESSURE TRANSDUCER BASED ON CAPACITANCE CHANGE PRINCIPLES

BACKGROUND OF THE INVENTION

The invention relates to transducers for measuring changes in environmental pressures and, in particular, to transducers utilizing capacitance change principles to achieve the measurements.

As already indicated, the present invention broadly contemplates a transducer having a diaphragm exposed to pressure variations in its environment. The resulting flex of the diaphragm moveably varies the plate spacing of the capacitor arrangement to produce a capacitance-modulated output signal directly proportional to the sensed pressure variations. Such a transducer obviously is capable of providing operable pressure sensing devices. However, probably because of particular difficulties to be considered, transducers of this general type apparently have not been developed to any appreciable extent. Certainly, as far as presently is known, there are no prior art developments capable of being used for the particular purposes contemplated in the present invention.

As to the presently-contemplated uses, the present transducer primarily is intended to measure pressure changes within a solid material. Specifically it is intended to be implanted or imbedded inside a solid propellent charge within a rocket motor. As is known, the condition of the propellant charge must be continuously monitored to provide a propellant stress analysis and to serve other functions such as the detection of propellant gasing, the determination of propellant cure time and the detection of propellant cracks and case bond failures. Also, monitoring must be conducted for exceedingly long periods of time and this requirement itself imposes difficulties which cannot be resolved in conventional manners.

Conventional capacitive transducers are not suited for use in the particular applications with which the present invention is concerned. For example, such transducers normally employ power and signal cables. However, the physical presence of such cables in the solid material provides undesirable paths for temperature dissipation and pressure leakage and they also produce additional stress perturbation. The use of batteries avoids the cable problem but batteries have a limited life and also they present safety problems.

Another very real difficulty is to assure the accuracy and reliability of the transducers. For example, accuracy in pressure variation measurements requires an unvarying long-term stability and, if such stability is to be achieved with an acceptable degree of certainty, it is necessary to provide a relatively high initial capacitance and a large full scale capacitance change with pressure. Further, a particularly vital consideration is that the transducers demonstrate a linear capability or, in other words, a signal output which is linearly proportional to the applied stress and, along with the linearity, the transducers should yield a high output signal. Although the relationship between linearity and high output will be discussed subsequently it can be noted at this point that high output is to some extent a function of the degree to which the capacitor plates are moved by the pressure-sensing diaphragm, i.e., large excursions, can produce comparably large changes in capacitance. However, as is known, when capacitor plates are moved into a relatively close proximity one with the other, the capacitance begins to vary in a non-linear or exponential manner and this undesirable result must be controlled by limiting the plate movement to regions in which the capacitance changes are linear. Consequently, the limited movement needed for linearity conflicts somewhat with the desire for high output levels. Apparently, factors such as these have presented real difficulties which have discouraged the development of sensors of this type.

Another problem involves the fact that these instruments may be implanted or used in materials which are subject to widely-varying temperatures. If so, temperature-produced dimensional changes may result in an undesirable loading or unloading effect on the diaphragm. Consequently, any sensors or transducers in which accuracy over relatively long periods of time is significant must take into consideration the temperature effects and, consequently, must provide some means for temperature compensation.

The objects of the present invention are to provide a transducer which, generally, resolves problems which have been mentioned in a satisfactory manner. In particular, an object is to provide a pressure-sensing transducer having a relatively high output which also provides a linear representation of the stresses acting on the transducer diaphragm.

Another object is to assure the long term stability of the transducer and, in conjunction with the stability, to avoid the degrading effects of dimensional changes produced by widely-varying temperatures.

A further object which has briefly been considered is to provide a capacitive-type of transducer adapted to be linked to a telemetry system both for input power and output data transmittal.

Other objects are to provide a transducer arrangement which is relatively simple, rugged and sufficiently reliable to allow operation over extended periods of time.

In general, the objects of the invention are achieved by the use of the so-called load piston which is carried centrally by the diaphragm in firm contact with the capacitor plates and which is a sufficient size to apply the relatively large excursions or movements derived from the central or axial portion of the diaphragm over the entire capacitor plate surface. Plate movement then can be closely controlled so that the capacitance variations are within the linear region of the plate spacing. Also, the load piston can be tailored to provide the desired temperature compensation or, in other words, to counteract the temperature-produced dimensional changes occuring in other parts of the transducer. In the preferred form, a stack of capacitors is employed and various dimensions, including the plate spacing and the diaphragm thickness, as well as the load piston thickness, are controlled to assure both the desired high output and the linearity of the output. Other features of the invention, will be considered in the detailed description of the invention.

BRIEF DESCRIPTION OF THE DRAWINGS

The present invention is illustrated in the accompanying drawings of which.

DETAILED DESCRIPTION OF THE INVENTION

Figure 1:
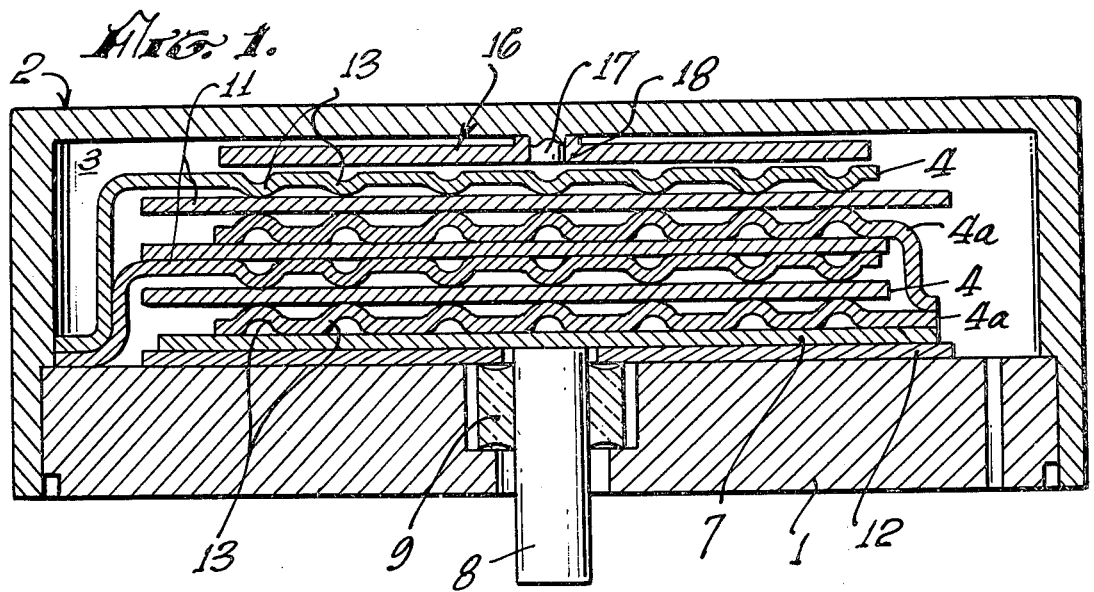
FIG. 1 is a somewhat diagrammatic sectional view of the operational components of the transducer.

Referring to FIG. 1, principal functional components of the transducer include a base plate 1 and a cup-shaped diaphragm 2, the diaphragm fitting around the base plate and being electrically bonded to it to provide a pressure reference cavity 3 in which are mounted a stack of capacitor plates 4. Cavity 3 is a reduced-pressure chamber evacuated through port 6 provided in the base plate. A stack of at least 4 capacitor plates is used although, of course, the number of plates is optional and will depend somewhat upon intended use. Each of the plates is charged to provide the desired plate capacitance and, as shown, adjacent plate 4 and 4a are oppositely charged. In a manner that will be described, plates 4 derive their charge from base plate 1, while plates 4a derive their charge from a support plate 7 and a pin 8 extending downwardly through the base plate and an insulating glass insert 9. Thin mica disks 11 are disposed as the dielectric between each of the pairs of capacitor plates 4 and 4a and another mica sheet or plate 12 is disposed between support plate 7 and base plate 1. Since, as will be described, plate 1 is electrically charged, a capacitance exists between the two members. However, since plate 7 is firmly backed by base plate 1, it does not move responsively to diaphragm excursions and consequently it plays no part in stress measurements which are a function of the diaphragm excursions.

A significant factor to be noted is that the pairs of capacitor plates 4 and 4a are disposed and maintained a particular, spaced distance one from the other and, to a degree, the spacing is a function of the thickness of mica sheets 11. However, as shown, each capacitor plate 4 and 4a is embossed or provided with a number of protuberances, such as pips 13 which are of a particular height so that these pips, in turn, also control the desired plate spacing. In use, the flexing movements or excursions of the diaphragm are imparted to the plates to cause the stack to compress by causing the pips on the plates to become somewhat flattened. When the diaphragm returns to its normal position, the pips act as resilient members or springs to press the plates back into their normal, desired spaced arrangement.

Figure 2:
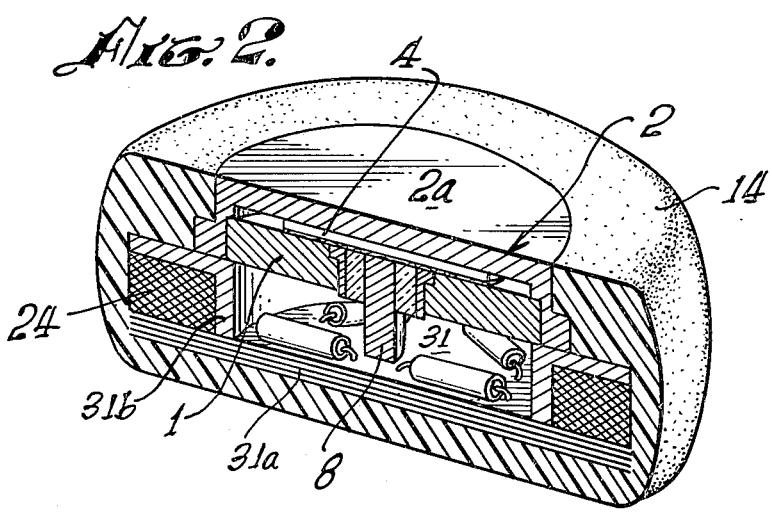
FIG. 2 is a cross section isometric of the pressure transducer arrangement.

FIG. 2 is provided to show the entire transducer package or, in other words, to show the manner in which the functional transducer components are enclosed by a casing 14. Preferably, casing 14 is an epoxy resin completely surrounding the transducer components with the exception of a portion of diaphragm 2 which, in use, is exposed to the environment in which the transducer is implanted. For purposes of description, it will be noted that the exposed portion of diaphragm 2 is a horizontal disc-like extent 2a. Preferably, the exposed portion is circular as other components such as plates 4, 4a and base plate 1.

A unique feature of the present invention is the use of a load piston member 16. Structurally considered, piston member 16 again is a disc-like plate carried by a pin projection 17 formed centrally or axially on the lower surface of diaphragm portion 2a. In particular, piston 16 is provided with a hub portion 18 to receive pin 17 and the two members are securely fitted together so that the piston moves with the diaphragm. Except for hub portion 18, the disc-like extents of the piston are spaced from the diaphragm and, in particular, are in a firm, loading engagement with the flat upper portion of upper capacitor plate 4. The firm engagement of the capacitor plate by the piston is needed to assure a stable arrangement which imparts the excursions at the center of the diaphragm to the plates through the piston. The loading or preloading of the plates also is a significant consideration that will be subsequently explained.

Generally considered, the use of the load piston provides several distinct advantages. First, it applies the relatively large excursion at the center of the diaphragm to the capacitor stack in a manner that translates the excursion into a uniform compression of the stack. As a result, the load piston is capable of providing an ultra-high output from transducers which use relatively soft compliant diaphragms. In addition, it makes possible the use of the transducer having diaphragms with unusually low deflection rates such, for example, as a deflection rate of as low as 0.6 microinches/psi while nevertheless maintaining high output and good stability. In a manner to be described, it also assures a linear transducer output. This fact is significant since, if the output were non-linear, the system design would become complicated and expensive because computer arrangements would be needed to translate the output into readily understandable engineering units. In part, the linearity of the output is due to the uniform compression of the capacitor stack which, in turn, is produced by the piston. If, for example, a piston is not used, the compression of the stack would not be uniform unless the capacitor plates themselves were relatively thick and inflexible metal sheets. The present capacitor plates preferably are thin, flexible members of about 1 mil thickness. Consequently, without a load piston, these plates would flex or bend more in their central portions than in their outer or peripheral portions. The results would be that spacing between the plates would vary from the center outwardly and that this variation would produce non-linear uncertainties in the output.

Another distinct advantage of the piston is that it can be utilized for the temperature compensation purposes which have been described. In this regard, it is intended that the present transducer components, except for the mica, be formed of stainless steel metal although, of course, other materals may be used to suit particular situations. Since each component has a differing coefficient of thermal expansion, variations in temperature produce dimensional changes in the cylindrical section of the transducer which, in turn, can cause a capacitance change. For example, a particular temperature change may cause the pressure cavity to, in effect, grow away from the base plate so as to vary the loading or contact between the capacitor plates and the diaphragm. In this event, there would be an unloading of the capacitor which would appear to the transducer to be a negative-going pressure effect. Other temperature changes may increase the loading of the diaphragm and appear as an increase in the pressure to be sensed. In the present arrangement, load piston 16 is tailored to counteract the undesirable results of the dimensional changes in the other members. In particular, the piston is made of a material having a higher coefficient of thermal expansion than that from which the other components are machined. The tailoring achieved by controlling the thermal expansion coefficients is such that, if the temperature-produced dimensional changes of the other components cause the cavity to grow away from the base plate, the piston expands its dimension due to its higher coefficient of thermal expansion sufficiently to compensate for the growth of the pressure cavity and thereby to maintain the desired loading effect upon the capacitor plates. If the temperature change contracts the cavity, the piston dimension contracts sufficiently to maintain a predetermined loading even though the cavity contraction otherwise would increase the loading. In practice, using a particular transducer which will be described, the null sensitivity of the instrument to temperature has been tailored to provide a temperature sensitivity of less than 0.005 psi/degree F.

It has been noted that the present transducer primarily is intended for use in rocket motors. In particular, it is in small capsule form capable of being implanted at selected portions within the solid propellant charge of the rocket motor. Although this particular use is only one of the many applications, it can serve to describe the principles of the present invention. First, since the transducer is to be implanted within a propellant charge and since power cables, wires, etc. are unacceptable, the present system derives power, both its input and output power, by its linkage to a telemetry system. More specifically, the transducer includes circuitry capable of receiving a particular signal frequency and utilizing the received signal voltage both to charge the capacitor plates and to drive an oscillator which, in turn, generates a signal capable of being remotely received. The capacitance of the transducer plates is a part of the oscillator circuit so that variations in the plate capacitance produced by pressure stresses modulate the oscillator signal to provide an output representative of the pressure variations. Such a transducer more aptly can be considered as a wireless 'transensor'.

Figure 3:
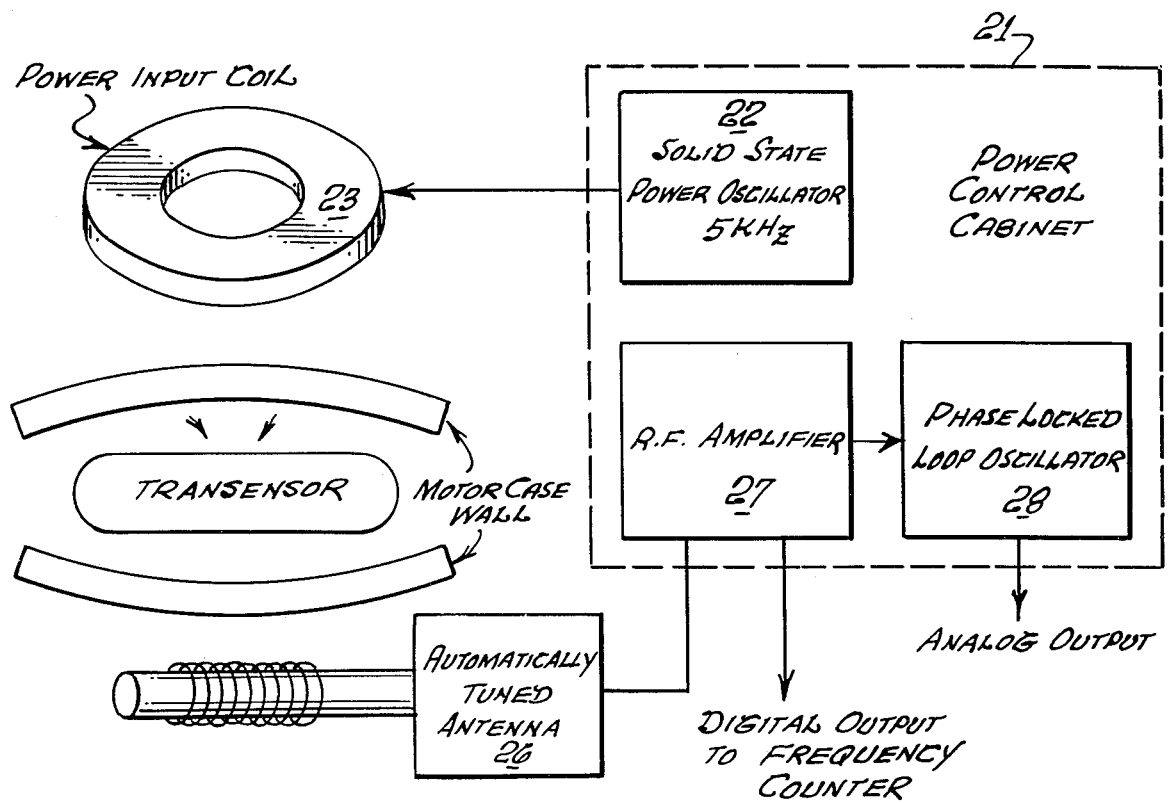
FIG. 3 is a schematic illustration of the transensor system including in block form the components used to power the transducer and to receive its data output.

The telemetry system generally is illustrated in FIG. 3 which, in block form, shows a remotely-disposed power control cabinet 21 that includes a solid state power oscillator 22 having a power input coil 23. The power input coil is excited by the 5 KHz oscillator and the resulting signal is picked up at the transensor inductance loop identified in FIG. 2 as an energy pickup coil 24. The signal energy picked up by the inductance loop is converted to DC power to operate a 3–5 MHz oscillator and, as will be described with respect to FIG. 4, the oscillator includes the pressure-sensing capacitance.

Figure 4:
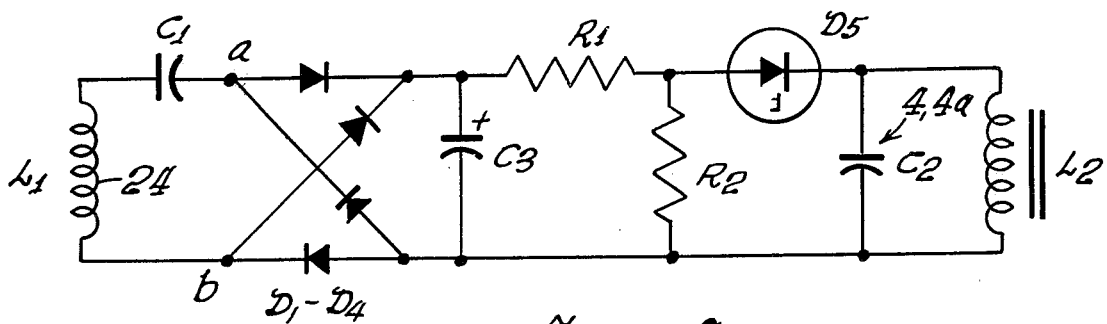
FIG. 4 is a circuit diagram of the receiving and transmitting system carried by the transducer itself.

Referring to FIG. 4 circuitry, it first can be noted that there are only twelve components which obviously provide simplicity and contribute to reliability. Previously-identified coil 24, as shown, is an inductance loop formed of a coil L1 and a capacitor C1. The loop is tuned to the 5 KHz signal for minimum power requirement as well as for maximum isolation from other power sources. The induced voltage is rectified and filtered by a diode bridge D1–D4 and another capacitor C3. The resulting DC voltage is supplied as operating power for the oscillator section of the transensor. The voltage divider illustrated in FIG. 4 and identified as R1 and R2 provides the proper bias voltage for a tunnel diode D5 so that it will support the oscillation of a tank circuit C2 and L2 without influencing its operating frequency. Capacitor C2 of the tank circuit is the capacitance of the loaded capacitor plates 4 and 4a so that, as is apparent, the capacitor plates are charged by the signal voltage and the variations in the capacitance of plates 4 and 4a modulate the oscillator frequency to provide a output frequency that can be detected remotely at the location of power control cabinet 21. More specifically, the frequency of the oscillator is controlled by the inductance of the coil and the capacitance of the capacitor plates. Since the inductance of the coil is fixed, the pressure sensitive capacitance of the plates is the only variable in the circuit. Radiation from the transensor oscillator is detected by a sharply tuned antena 26 (FIG. 3) and applied to an R.F. amplifier 27 which in turn produces a digital output to a frequency counter. An analog output also can be obtained through a phase-locked loop osciliator 28. By way of illustration, it can be considered that the plate capacitance of the plates 4 and 4a or of capacitor C2 of FIG. 4 is in the order of 250–300 pF and the arrangement is such that capacitance changes due to plate movement are within a range of 100–150% of the initial capacitance. This range, as earlier stated, lies within the linear region of the pressure-produced capacitance changes.

Other features will be better understood by considering certain structural and dimensional details. For example, diaphragm 2 is an inverted cup-shaped member preferably formed of 17-4 PH S steel or Elinvar and, as shown, the downwardly extending legs of the diaphragm are closely fitted to the peripheral walls of base plate 1. These two members are sealably bonded together preferably by electric bonding to provide sealed pressure reference cavity 3. Base plate 1 may be formed of the same material as the diaphragm although, as shown, it is considerably thicker to provide a stiff, unyielding support for the capacitor stack. The capacitor plates themselves are thin, flexible members formed of Elinvar or stainless steel and the same material may be used to form support plate 7 on which the stack directly rests. As indicated, the capacitor plate thickness is about 1 mil and mica sheets 11 are of the same thickness. To provide some idea of size, the plate diameter may be about 0.450 inches.

Pips or dimples 13 formed on the capacitor plates may be provided with a variety of sizes and spacings. However, the pip height is a matter that is closely controlled in accordance with the particular pressure range for which the transensor is adapted. Several ranges are contemplated and these will be described in greater detail. With regard to pips 13, they may have a diameter of about 0.025 inches and, in a preferred form, approximately 37 pips are provided per plate.

As is apparent in the FIG. 4 circuit diagram, capacitor plates 4 and 4a are charged by the signal voltage. Plates 4 derive their charge from base plate 1 (FIG. 1) and, for this purpose, the plates each are provided with downwardly extending leg portions contacting plate 1. Similarly, plates 4a are charged by pin 8 and support plate 7 and, for this purpose, these plates have leg portions contacting the support plate.

The plate charging arrangement, as well as other electrical components are better illustrated in FIG. 2. As shown, energy coil 24 is coupled to a printed circuit board 31 which has a horizontal extent 31a and another extent 31b both of which encompass the coil. Pin 8 which is used to charge plates 4a is coupled into the circuit board portion 31a. The arrangement is such that the voltage derived from the signal is imparted to base plate 1 and to pin 8 and the base plate is opposite to the pin 8 potential. The FIG. 2 components are coupled into the circuit board. Finally, the entire arrangement including the circuit board, the coil, the base plate and the capacitors plates are potted in an epoxy resin casing 14 in a manner that leaves diaphragm portion 2a exposed to the propellant stresses to be measured. Further, as will be noted, the arrangement provides a chamber between the lower portion of the base plate and the circuit board and, preferably, this chamber is filled with a fine grained aluminum oxide powder that is vibrated firmly into place.

The operation best can be described with regard to the preferred use as a transensor capsule implanted in a solid propellant charge of a rocket motor. In such a use, it is intended that a number of the transensors be implanted at selected locations and that, for example, such transensors be operated from one power control system which transmits the 5 KHz signal to the transensors and receives their capacitance-modulated output signal. The output can be automatically recorded in digital form periodically about every 20 seconds and constant analog monitoring also is provided. It is anticipated that automatic transensor control systems can be established at any number of locations. Each of such will receive raw data from any number of transensors, the raw data then being transmitted over land lines to a computer where it automatically will be reduced to engineering units and filed for analysis.

Depending upon the particular condition to be monitored, the transensors are constructed with varying degrees of sensitivity which, in turn, are dependent upon the magnitude of the ambient pressure which is anticipated. For example, several types of pressure transensors presently are being used and each type provides a different level of sensitivity. One such type is an ultra-sensitive device used for pressure ranges of 0–100 psi primarily to measure minute pressure changes such as the gasing rate in propellants or biometric changes. A second type is designed for pressure ranges of 0–500 psi and third for a range of 0–1500 psi. The mid-range transensor is formed with a thicker diaphragm than the ultra-sensitive transensor, while the higher range device provides an extremely small deflection rate at its sensitive surface. The third type, for example, provides a resolution of better than 0.1 psi with a diaphragm deflection of less than 0.6 micro inch per psi. The mid-range and higher range transensors are used for monitoring propellant conditions involving cure time and pressure or the detection of propellant cracks and case bond failures. The transensors also can be used for such purposes as revealing changes in the propellant modulus.

The particular advantages of the transducer arrangement involve their capability of providing a relatively high output regardless of the compliancy or softness of the diaphragm. As indicated, a high output is obtained even though the deflection rate is as low as 0.6 micro inch/psi. Outputs using relatively soft diaphragms can be characterized as being ultra-high. Importantly, the high output is achieved in a linear manner so that complicated computer techniques do not have to be provided to resolve non-linearities. In large part, the high output is due to the use of the load piston which uniformly compresses the stack of capacitor plates. Since the piston derives its movement from the center of the diaphragm it is capable of achieving five to six times the excursion of deflection that otherwise would be achieved without using the piston. Obviously, the stack of capacitor plates contributes to the high output and thus becomes a significant factor. However, since high output is a relative matter, it is conceivable that adequate performance can be achieved without stacking.

Linearity is somewhat dependent upon the use of the load piston to uniformly compress the stack since, as explained, the compression is uniform throughout the entire plate area. The other significant consideration affecting linearity involves the fact that the present piston is used to actually load the capacitor stack.

Linearity is achieved by establishing a particular capacitor plate spacing and by assuring that the spacing or plate distance varies with pressure only to a limited extent which is the extent lying within the linear portion of the full-scale capacitance changes. The load piston establishes the plate spacing precisely and it uniformly compresses the plates through the limited distance determined by the pressure range for which the particular transensor type is adapted. More specifically, the plate spacing, as shown in FIG. 1, initially is a function of the height of the embossments or pips 13 formed on the plates as well as the thickness of the micro sheets used between them. This spacing, in turn, is dependent upon the degree of deflection anticipated for the particular transensor type. For this reason, the transensor type adapted for pressure ranges of 0–100 psi can have its plates formed with pips having a height of about 5 mils. In a higher pressure range, 0–1500 psi, the pips may be 50 mils. Pip height is an important factor in determining the plate spacing since, for practical purposes, the plate thickness and the thickness of the micro sheets are uniform.

To assure a linear output, the transensor initially is tested before being implanted in the propellant. In this test, a load piston of a particular thickness is used and known mechanical forces applied to the diaphragm to produce an output curve which can be analyzed. The diaphragm thickness and its deflection range obviously is varied for each pressure range to be measured. If the output curve shows a non-linearity, a piston of another thickness can be substituted and the testing repeated until the output curve demonstrates the desired linearity. In other words, the thickness of the piston is applying a load to the capacitor plates which slightly varies the initial spacing set by the pips to provide a precise spacing which, when varied by the ambient pressures within the anticipated pressure range, provides the linear response. Again, it will be appreciated that the use of the multi-capacitor stack contributes significantly to the facility for achieving the linearity. In other words, each pair of capacitor plates in the stack need move only a slight distance which can be well within the linear range and, nevertheless, the changes in the capacitance in each pair can add to provide the desired output signal level. The other factor aside from the limited extent of the capacitor plate movement is the fact that the plates are moved or compressed uniformly rather than being flexed or bent in the middle more than along the outer edges. This factor is particularly important when the diaphragm itself is stiffer than the capacitor plates. However, if not, the load piston nevertheless distributes the force evenly over the plates to provide a more reliable and acurate measurement of the ambient pressures.

Finally, as has already been described, the load piston, in addition to assuring a high output and a linear output, also provides the temperature compensation factor which is needed for accuracy and high resolution. The transducer essentially is a steel casing in which the pressure reference cavity can enlarge or contract in accordance with the coefficient of thermal expansion of the steel components. Since the load piston is exerting a precise load on the capacitor plates, this precise load must be maintained regardless of temperature-caused dimensional changes in the cavity. The desired loading can be maintained throughout the anticipated temperature range by fabricating the load piston from a material having a higher coefficient of expansion than the other members. In a preferred form, the load piston is fabricated from Nickel steel while the other components are 17-4 PH S steel.

Aside from the functional advantages, it is to be recognized that the entire arrangement is relatively simple, inexpensive and sufficiently reliable and rugged to permit unattended use for very long periods of time.

Obviously many modifications and varations of the present invention are possible in the light of the above teachings. It is therefore to be understood that within the scope of the appended claims the invention may be practiced otherwise than as specifically described.

I claim:
1. Capacitive transducer apparatus for measuring and sensing ambient environmental pressure variations comprising:
    a plurality of disc-like capacitor plates disposed a spaced distance one from the other,
    resilient means associated with said plates for yieldably maintaining said spaced distance,
    a dielectric substance within said space,
    voltage means for capacitively charging said plates,
    a diaphragm member having a disc-like extent disposed over said plates,
    a disc-like piston member coaxially secured to said disc-like extent, said member being substantially coextensive with said plates and being disposed in firm contact with one of the said plates at a spaced distance from said diaphragm,
    said disc-like extent being exposed to said environment whereby ambient pressure-produced diaphragm movements are distributively transmitted through said load piston to uniformly move said plates and vary their capacitance, and
    capacitance output means.
2. The apparatus of claim 1 wherein said piston is sized to exert an initial load on said resilient means for establishing said capacitor plate spacing.
3. The apparatus of claim 2 wherein said diaphragm is formed with a particular stiffness corresponding to an anticipated range of ambient pressures and said loaded plate spacing is fixed to provide a linear capacitance output for pressure changes within said range.
4. The apparatus of claim 3 wherein said plurality of capacitor plates is a stack of plates formed of plural pairs of oppositely charged plates.
5. The apparatus of claim 3 wherein said diaphragm extent is stiffer than said capacitor plates.
6. The apparatus of claim 1 wherein:
    said dielectric substance is provided by a sheet of dielectric material, and
    said resilient means is provided by forming said plates with embossments in the form of uniformly distributed pips, said pips engaging said dielectric sheets for acting as spacing elements for yielding and recovering said plate movements.
7. The apparatus of claim 6 wherein said piston is sized to exert an initial load on said embossed plates for establishing said capacitor plate spacing, and said diaphragm is formed with a particular stiffness corresponding to an anticipated range of ambient pressures,
    said embossed pips having a particular height determined by said ambient pressure range, and
    said loaded plate spacing being fixed to provide a linear capacitance output for pressure changes within said range.
8. The apparatus of claim 1 further including:
    a back plate member unyieldably supporting said capacitor plates.
9. The apparatus of claim 8 wherein said diaphragm and back-plate members each are formed of a material having a particular coefficient of thermal expansion
    said load piston member, being formed of a material having a higher coefficient of thermal expansion than said members and said higher coefficient being selected to compensate for the thermal expansion of said other members whereby the effect of temperature changes in said transducer environment on said capacitance is reduced to a minimum.
10. The apparatus of claim 1 wherein said diaphragm and back plate members sealably engage one another for providing a pressure-reference cavity,
    said load piston and capacitor plates being disposed in said cavity.
11. The apparatus of claim 10 further including:
    a casing closely encapsulating all but said disc-like extent of said diaphragm.
12. The apparatus of claim 11 wherein:
    said plate charging voltage means and said capacitance output each are a telemetered means.

* * * * *